(No Model.) 2 Sheets—Sheet 1.
H. L. BUMP.
SAW FILING MACHINE.
No. 381,610. Patented Apr. 24, 1888.
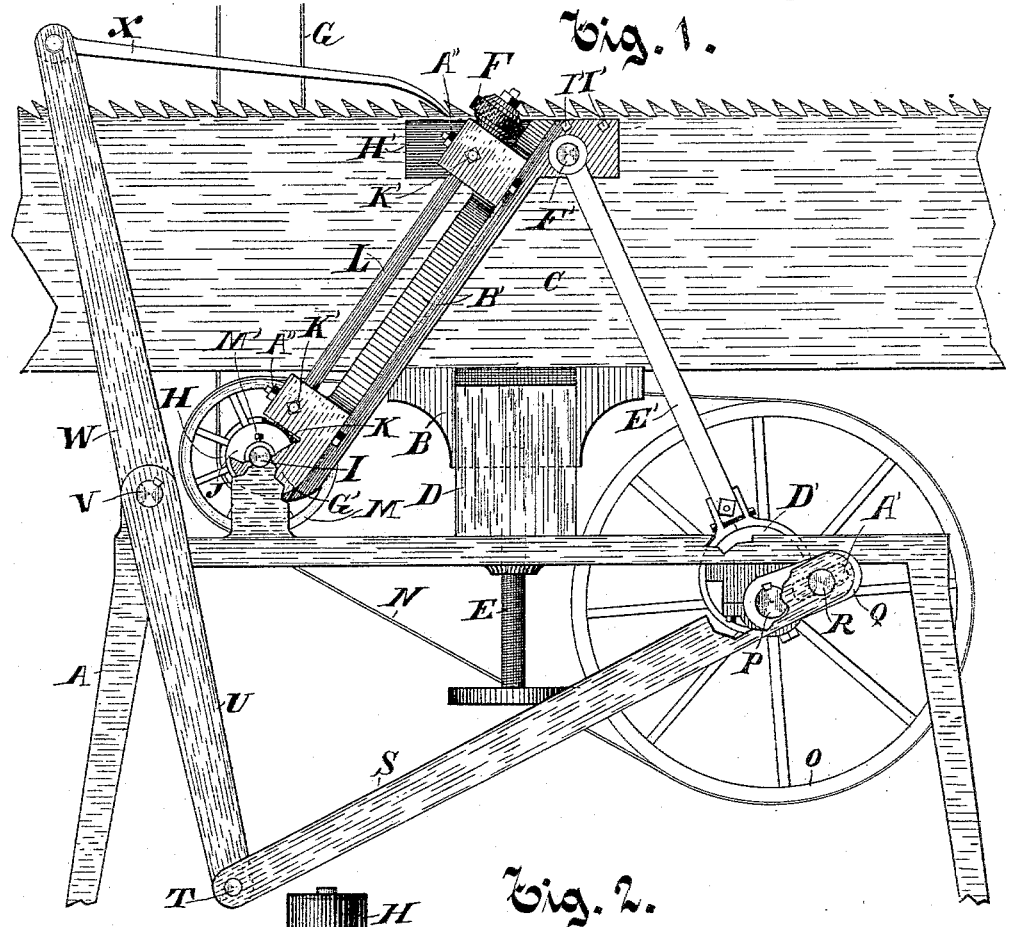
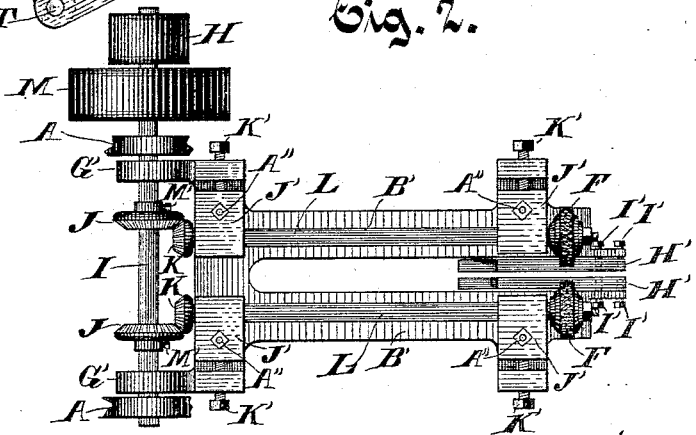
Witnesses.
Inventor.

(No Model.) 2 Sheets—Sheet 2.
H. L. BUMP.
SAW FILING MACHINE.
No. 381,610. Patented Apr. 24, 1888.
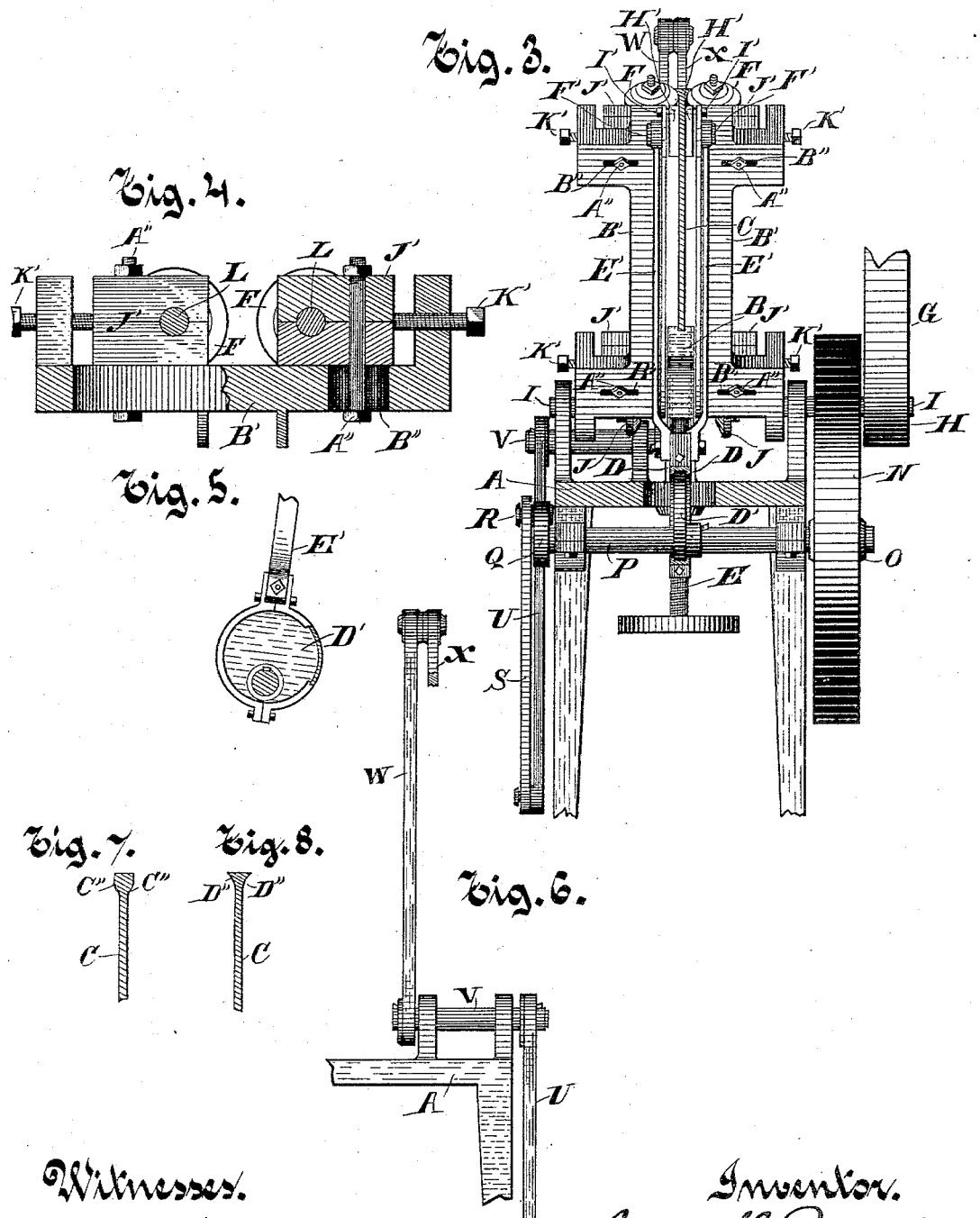
Witnesses.
Anna Faust
O. N. Keeney
Inventor.
Hiram L. Bump.
By Erwin & Benedict
Attorneys.

UNITED STATES PATENT OFFICE.

HERMAN L. BUMP, OF McMILLAN, WISCONSIN.

SAW-FILING MACHINE.

SPECIFICATION forming part of Letters Patent No. 381,610, dated April 24, 1888.

Application filed October 8, 1887. Serial No. 251,801. (No model.)

*To all whom it may concern:*

Be it known that I, HERMAN L. BUMP, of McMillan, in the county of Marathon and State of Wisconsin, have invented new and useful Improvements in Saw-Filing Machines; and I do hereby declare the following to be a full, clear, and exact description of said invention, reference being had to the accompanying drawings, and to the letters or figures of reference marked thereon, which form a part of this specification.

The object of my invention is to provide a machine for simultaneously filing off and giving the proper shape to the sides of saw-teeth after the same have been swaged or upset at their points, thereby making all the teeth of exact uniform widths throughout the blade. Heretofore it has been common after upsetting or swaging a saw to bend the teeth to bring their cutting-sides in line with each other; but owing to the elasticity of the metal it is impossible to keep the cutting-sides of the teeth in exact line with each other, as some teeth are liable to project farther upon the respective sides of the blade than others, and when bent in line they are inclined to spring back again to their former position.

It is obvious that by my improvement in cutting or filing the sides of the teeth they will remain permanently in line with each other, and the trouble heretofore experienced in bringing and retaining the teeth in line is overcome, and I am enabled by thus dressing the teeth of the saw to greatly improve its work, and with a saw thus made to make a much smoother and cleaner cut than it is possible to make with a saw prepared in the ordinary manner, and a saw thus prepared will also cut much faster and easier than one which is prepared in the ordinary way.

The construction of my invention is explained by reference to the accompanying drawings, in which—

Figure 1 represents a side view of the machine and a part of a saw-blade therein in position to be operated upon. Fig. 2 is a detail. Fig. 3 is an end view of the machine. Figs. 4, 5, and 6 are details. Fig. 7 represents an end view of a saw-blade, showing the shape of a tooth as it appears when swaged and before being filed by my machine. Fig. 8 represents the same tooth as that shown in Fig. 7, as it appears after being filed preparatory for use.

Like parts are represented by the same reference-letters throughout the several views.

A represents the supporting-frame of the machine.

B is an adjustable supporting-bracket, upon which a portion of a saw-blade, C, is shown held in position to be operated upon by the machine. The bracket B is provided with grooves which engage upon the stationary standard D, and is adapted to be raised and lowered by the action of the hand-screw E, which hand-screw E operates in screw-threaded bearings in the standard D, and bears at its upper end within a socket in the bracket B, whereby as said hand-screw E is turned toward the right said bracket B and saw C are raised, and whereby by a reverse movement of the hand-screw E said bracket B and saw C are lowered, and the saw thus adjusted at the required height to be operated upon.

The sides of the saw-teeth are simultaneously filed or cut to the required shape by the two rotary files F F, and the convex surfaces of the files F produce the desired concave shape to the respective sides of the teeth which is required, while they also remove all superfluous metal from the cutting-sides of the teeth, leaving them all of uniform width and shape, as heretofore stated.

Motion is communicated from the motive power to the rotary files F through the belt G, pulley H, shaft I, beveled gears J J and K K, and shafts L L. Thus it is obvious that when the files are rapidly rotated they will simultaneously act upon the respective sides of the saw-teeth as they are, one after another, brought between them. The parts of the invention hereinafter described pertain more especially to the mechanism for automatically moving the saw forward one tooth after another between said rotating files, and also to the mechanism for removing said files from contact with the teeth during the interval that the saw is being moved forward in position to be acted upon.

Motion is communicated from the driving-shaft I to the saw-blade C through the pulley M, belt N, belt-wheel O, shaft P, crank Q, crank-pin R, connecting-bar S, pivot T, lever U, pivotal shaft V, lever W, and pawl X. Thus it is obvious that with each revolution of the band-wheel O motion is communicated through said parts in the order mentioned to said pawl X, and the same is thereby carried first backward past one tooth of the saw, and then forward just far enough to bring the next preceding tooth between said rotary files in position to be acted upon thereby. During all that part of the rotary movement of the wheel O which carries the pawl X rearward the saw-blade remains at rest, and the blade is only moved forward during that part of the rotary movement of the wheel O in which the crank-pin R is moving rearward or toward the left beneath the shaft P. A slot, A', is formed in the crank Q for the reception of the crank-pin R, which slot A' permits the crank-pin R to be adjusted near to or farther from the shaft P, whereby the diameter of the circle described by the crank-pin R is increased or diminished, and whereby the stroke of the pawl X, connected therewith, may be increased or diminished, as may be required, to conform to the length of the saw-teeth, or the spaces between them, of the saw which is being acted upon. Immediately previous to the rearward movement of the saw-blade described, caused by the action of the pawl X, the rotary files F, together with the upper end of their supporting-frame B', are moved downward and forward out of contact with the teeth, when, as the next succeeding tooth is brought in place, the upper end of said supporting-frame B', together with said rotary files, are moved back again. The upward and downward movement of the rotary files and supporting-frame is communicated thereto from the shaft P through the eccentric D', connecting-bar E', and pivot F'. Thus it is obvious that with each revolution of the wheel O the rotary files, with their supporting-frame, are gradually moved upward and downward, thus traversing twice across the sides of the teeth. The rotary movement of the files is continuous while out as well as while in contact with the teeth, and consequently the surfaces of the teeth are gradually cut as said files are moved slowly upward and downward over them. The lower end of the supporting-frame B' is pivoted and supported upon the shaft I at the respective side bearings, G', thereby permitting of the required swinging movement of the frame B' without disengaging the operating mechanism or changing the operative relations of the band-pulleys and cog-gears upon said shaft I with those with which they are connected.

H' H' are adjustable bearing plates, which bear against the respective sides of the saw-blade with sufficient force only to keep it in place while being filed or cut, but which still permit of their free movement along the surface of the saw as the frame with the files are moved upward and downward, as stated.

The bearing-plates H' H' are adjusted to saws of different thicknesses by the adjusting-bolts I' I', which bolts have screw-threaded bearings in the sides of the frame B', while their ends are loosely fitted in sockets or recesses formed for their reception in said bearing-plates H'.

To provide for adjusting the rotary files F for saw-blades of different thicknesses, the shaft-supporting journal-boxes J' J' J' J' at the respective ends of the shafts L are made adjustable, and may be adjusted toward and from each other by the adjusting-bolts K' K' K' K', as shown in Fig. 2; and if such adjustment is great enough to materially affect the meshing of the gears J and K with each other then said gears J may, by releasing the set-screws M' M', be adjusted upon the shaft I to conform to the adjustment of the journal-boxes J' J'. The journal-boxes J' J' are adjustably secured to the supporting-frame B' by bolts A" A" A" A", (shown in Figs. 2, 3, and 4,) the lower ends of the bolts A" being provided with elongated slots B", in which they are free to move backward and forward, as may be required, to attain the required adjustment of the files to conform to the width of the saw.

C" C" represent respective sides of a saw-tooth as they appear after being swaged preparatory to being acted upon by my machine.

D" D" represent the concave surfaces formed by my rotary files upon the respective sides of the tooth, as they appear after having been operated upon by my machine.

Having thus described my invention, what I claim as new, and desire to secure by Letters Patent, is—

1. In a machine for filing the sides of swaged saw-teeth to uniform thicknesses, the combination of two rotary files, F F, respectively adapted to simultaneously act upon the respective sides of the saw-teeth of a saw, two swinging file-supporting shafts, L L, respectively geared to a pivotal supporting-shaft, and oscillating shaft-supporting frame B, pivoted at one end upon said supporting-shaft and connected at its other end by oscillating mechanism with the drive-shaft of the machine, substantially as and for the purpose set forth.

2. In a machine for cutting and forming the sides of swaged saw-teeth into uniform shapes and thicknesses, the combination of the file-supporting frame B', connecting-bar E', pivoted at one end to said frame B' and connecting at its other end by an eccentric, D', to a rotary shaft, P, whereby with each rotation of said shaft P said frame B' is oscillated upon its supporting-shaft I, supporting-shaft I, stationary frame A, beveled gears J J and K K, communicating between the pivotal drive-shaft I and the file-supporting shafts L L, shafts L L, rotary files F F, and mechanism for simultaneously communicating motion from said eccentric supporting-shaft P to said pawl X and saw-supporting frame B, whereby as said files are rotated they are simultaneously moved in and out of contact with the surface to be filed, substantially as and for the purpose specified.

3. In a machine for cutting or forming the sides of swaged saw-teeth into uniform thicknesses, the combination of the file-supporting frame B', bar E', eccentric D', shaft P, crank Q, crank-pin R, connecting-bar S, lever N, pivotal shaft U, lever W, and pawl X, motion being simultaneously communicated from said shaft P through said crank, bar, levers, and pawl to the saw, and through eccentric D' and bar E' to the saw-supporting frame B', whereby said files are thrown out of contact with the saw-teeth as the saw is moved forward by the action of said pawl, substantially as and for the purpose set forth.

4. The combination of the frame B', pivoted at its front end to the rotary shaft I, adjustable journal-boxes J', shafts L, rotary files F, gears K, and adjustable gears J, said gears J, shafts L, and the rotary files thereon being adapted by moving said adjustable journal-boxes to be adjusted toward and from each other to conform to saws of various thicknesses, substantially as set forth.

5. In a machine for filing saws, the combination of the oscillating file-supporting frame B', pivoted at its lower end upon a supporting drive-shaft of the adjustable saw-guides or bearing-plates H' H', attached to the upper end of said frame B' upon the respective sides of the saw, and plate-adjusting screws I' I', said plates H' H' being adapted to hold the saw centrally between the rotating files at a point where the files come in contact with the saw-teeth, substantially as and for the purpose specified.

In testimony whereof I affix my signature in presence of two witnesses.

HERMAN L. BUMP.

Witnesses:
L. VAN HECKE,
GEO. H. REYNOLDS.